May 24, 1927.
H. J. MURRAY
1,629,727
ELECTRIC WAVE PRODUCING AND CHANGING DEVICE
Original Filed April 1, 1921  2 Sheets-Sheet 1
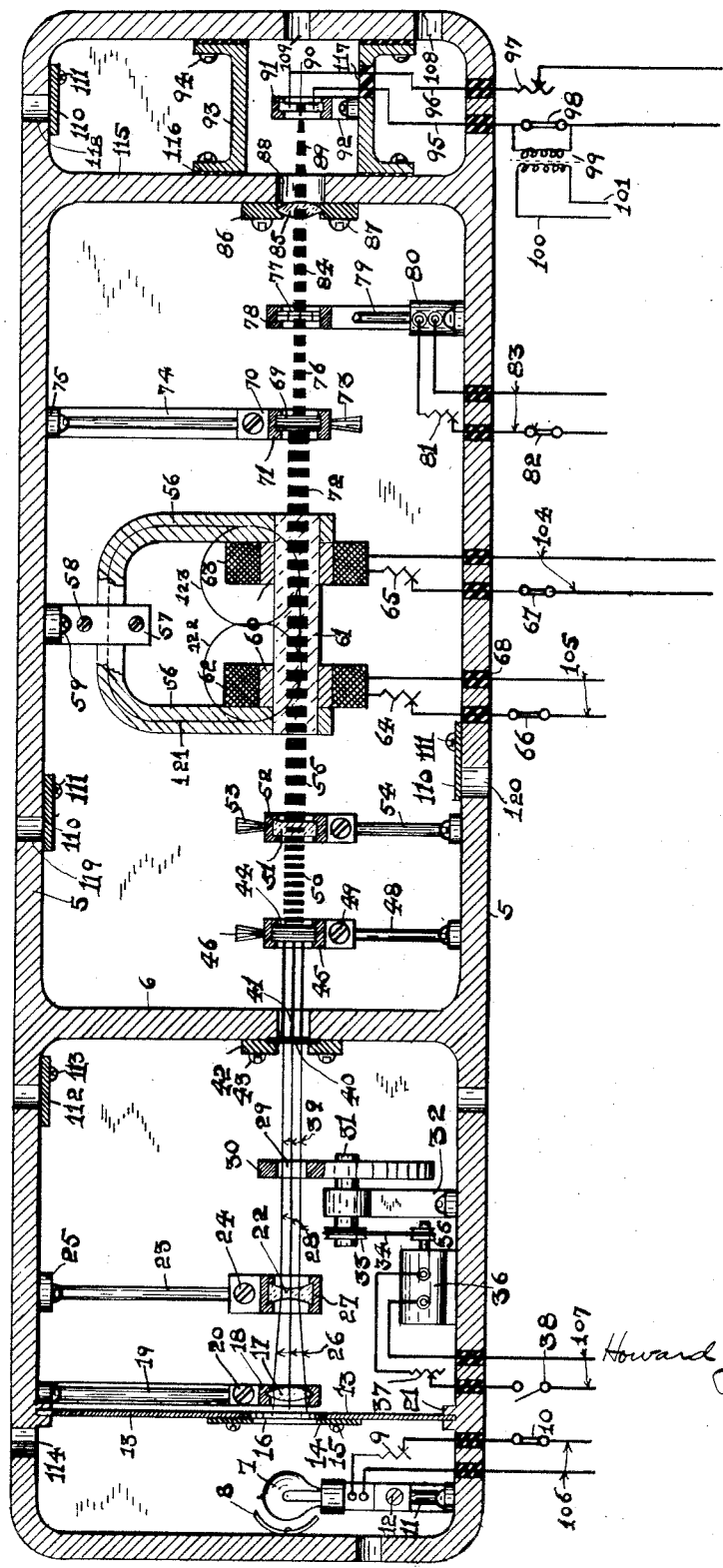
Howard J. Murray.
INVENTOR.

May 24, 1927.
H. J. MURRAY
1,629,727
ELECTRIC WAVE PRODUCING AND CHANGING DEVICE
Original Filed April 1, 1921   2 Sheets-Sheet 2
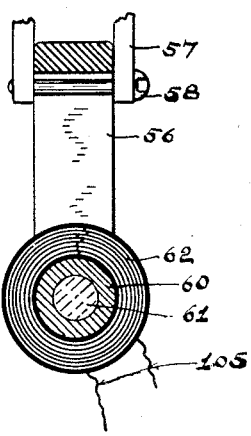
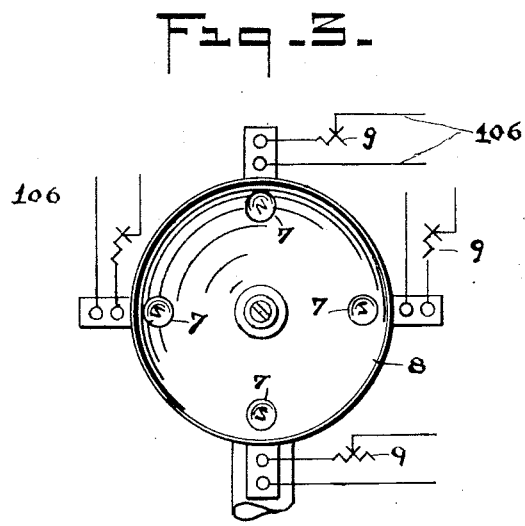
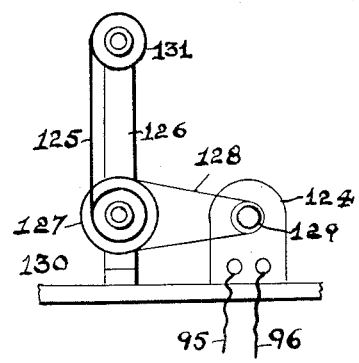
Howard J. Murray.
*INVENTOR.*

Patented May 24, 1927.

1,629,727

UNITED STATES PATENT OFFICE.

HOWARD J. MURRAY, OF BROOKLYN, NEW YORK.

ELECTRIC-WAVE PRODUCING AND CHANGING DEVICE.

Application filed April 1, 1921, Serial No. 457,627. Renewed November 13, 1926.

My invention relates in general to the amplification of electric current by means of a field of force rotating a plane of polarization of polarized light and the action of said rotation on matter susceptible to said light.

One of the general objects of my invention is to provide a simple device which may be used as an amplifier, an oscillator, a detector, or a rectifier, by the proper functioning of a field of force, a beam of polarized light, and a light affected cell forming a portion of an electric circuit.

A further object of my invention is to affect a high frequency oscillating field of flux by polarized light of varying intensity, and thus vary the current in a circuit of which a field producing means may be a portion.

For the purpose of explaining a theory of action which is believed to underlie the principles of my invention let it be first assumed that means are provided for employing an electric current (this current may be a portion or all of the current to be affected) to supply a magnetic field of force. Let it also be assumed that a beam of light is passed through a suitable "polarizer" and directed along the lines of force of the said magnetic field. Let it be further assumed that the said polarized light is then passed through a suitable "analyzer", and interpreted by a light affected resistance changing cell in operative connection with a closed electric circuit.

Now the magnetic rotation of the plane of polarization of a ray of light passing along lines of force (preferably in a transparent medium) is an accepted fact. It is also true that this rotation varies with the density of the said lines of force, transparent mediums, color of ray etc.

It has also been shown that if two slices of crystal of certain minerals (as for instance tourmaline) are cut in planes parallel with their axes and similarly situated at right angles with respect to a beam of light, the following phenomena will occur.

(a) The beam of light will be visible through both crystals.

(b) If one of the slices is rotated in a plane at right angles with the said beam, the said beam will grow dimmer or brighter according to the direction of rotation of the the said slice. If the slice is rotated from the brightest position for 90° the light will grow dimmer and finally disappear.

It is obvious that the amount of light passing through the "analyzer" will be varied by rotating the plane of polarization of one of the said slices. It is also a known fact that the light will be varied by the change in density of the said lines of force or the said source of light.

My invention primarily consists of suitably employing a light affected resistance changing element (such as a selenium cell) to intercept the above described varying light thereby causing the said varying lines of force to rotate the plane of polarization and thus vary the amount of light intercepted by the said light affected element.

Hence I am able to vary the current in the said closed electric circuit organization of which the said light affected element is a portion by varying the density of the said lines of force.

But the density of the light beam and the action of the light affected element on the said closed circuit are not in fixed proportion to the variation of the said field of force. Thus the variations of the current in the said electric circuit may be varied in both magnitude and form with respect to the variations of the said magnetic field.

It should also be noted that I employ alternating current flux producing means, and that the action of the magnetic flux and the light flux changes as the higher frequencies are employed. For instance, at carrier current frequencies the light flux affects the said magnetic flux. For the purpose of description the action may be described as follows: There is a certain relation between the ability of a rapidly oscillating field of flux to build up to its maximum strength and the intensity of light present. In other words, varying light in the presence of a rapidly oscillating field of flux affects and is affected by the said flux in some proportion to the intensity of the said light.

This action would cause in effect a correspondingly varying reluctance in a flux path of the said flux and hence in effect a similar varying impedance in the windings of the flux producing means. Such action would in turn vary the effective resistance of the said windings and thus the current, and the flux producing means would thereby become a light affected element.

Hence high frequency currents may be caused to flow in the flux producing means and light records superimposed on same due to the action of light on the magnetic flux produced as hereinbefore described.

The invention further contemplates the use of a sensitive light affected surface such as a moving photographic film to be affected by the said varying analyzed light, and thus record the variations of the density of the said lines of force.

The invention allows numerous physical embodiments and two different types are herein illustrated for the purpose of showing the wide application of the invention, but it is understood that the showings in the drawings are largely diagrammatic merely being sufficient in detail to show applications of the invention.

Referring to the accompanying drawings:—

Fig. #1 is largely a diagrammatic view of the arrangement of means and the necessary electrical connections to secure the amplification of current variations.

Fig. #2 is a view showing a cross-section of the field producing means and the flux path.

Fig. #3 shows a side front view of a means for obtaining a plurality of light sources and the individual control means.

Fig. #4 is a side view of the means providing a continuously moving, variable speed, motor driven light sensitive surface adapted to replace the light affected element in Fig. #1.

In the following description and in the claims parts will be identified by specific names for convenience of expression, but they are intended to be as generic in their application to similar parts as the art will permit.

Referring to Fig. #1 we have a container 5 provided with a securely fastened removable cover (not shown), preferably made of non-magnetic material having partitions 6 and 115. A source of light 7 is varied in intensity by the resistance 9 and is extinguished by the switch 10 in power leads 106. A reflector 8 is positioned so as to most economically project the light of 7 through an opening 16 of a variable aperture sheet 14 fastened to the slidable diaphragm 13 by means of screws 15. A convex lens 17 encased in a holder 18 is supported so as to converge the said light by an adjustable socket receiving the rod 19 and the screw 20. The light waves 26 are converged on the concave lens 22 and passed on as parallel rays 39. The lens 22 is enclosed in a holder 27 supported by an adjustable socket receiving the rod 23 and the set screw 24, and the entire arrangement fastened to the container 5 by means of a base 25.

A rotating disc 30 having openings 29 is properly mounted by means of support 32 and rotated by electric motor 36 by pulley 35, belt 34, and pulley 33. The variable resistance 37 is used to change the speed of the said motor so as to change the rate of interrupting the light beam 39, and the motor may be stopped by opening switch 38 and stopping the supply of power by the leads 107. A color screen 40 is securely held by collar 42 and screws 43 to the container partition 6, as pressure may be added to the central enclosure of the said container.

The colored light beam is then passed through a polarizing crystal 44 enclosed in holder 45 rotatable by means of handle 46. The holding means is supported by rod 48 and is adjusted by means of set screw 49. The polarized beam 50 is then passed through an interference medium such as lead gla  The medium is supported by rod 54 suitably fastened to the container. It is rotatably mounted in a holder 52 equipped with a handle 53.

The polarized colored light is then passed through a glass rod 61 forming part of a magnetic path and is held by permanent magnets 56 and pole pieces 60. The pole pieces are energized by windings 62 and 63 and the entire arrangement adjusted in position by set screws 58 and supported by clamps 57 securely fixed to the container 5 by screws 59.

The current in winding 62 is controlled by variable resistance 64 and switch 66 (in current leads 105). The current in winding 63 is controlled by variable resistance 65 and switch 67 in current leads 104. The magnetically affected light 72 is then passed through a rotatable analyzer 69 enclosed in casing 71 having a rotating handle 73 and adjustably supported by means of rod 74 and set screw 70. The entire arrangement is supported by base 75 securely fastened to container 5. The analyzed light 76 is then passed through a variable area aperture 77 consisting of radial moving sheets and operated by the rod 79 actuated by magnet 80. The magnet 80 is controlled by variable resistance 81 and switch 82 in the power leads 83.

The desired amount of light 84 is then passed through convex lens 85 securely held by collar 86 and screws 87 to the container partition 115 so as to resist pressure on either side. The focused light 89 is then intercepted by a selenium cell (or equivalent) 90 connected to leads 95 and 96 forming part of a circuit containing variable resistance 97, switch 98, transformer 99 and leads 100 and 101. The cell 90 is encased in a suitable holder 91 and supported by a standard 92. The cell and its supports are enclosed in a cylindrical pressure resisting container 93 securely fastened to the container 5 by means of bolts 94 and gaskets 116. The said cylinder 93 has insulating bushings 117 inserted in its wall to permit the proper passage of leads 95 and 96. The opening 109 may be used as a passage for gas, creating a vacuum ventilation, or placing pressure in the said pressure resisting cylinder.

The openings 108 and 118 are for the same purpose as regards the right hand compartment of container 5.

Similar openings as 114, 119, and 120 are used for like purposes in the other compartments.

The slidable covers 110 secured to the container 5 by screws 111 are for the purpose of varying the openings in said container.

In operation it may be assumed that circuit 106 is energized, switch 10 closed and lamp 7 lighted. Reflector 8 will concentrate the light from 7 through the opening 16 and lenses 17 and 22. The parallel rays 28 may be interrupted by disc 30, colored by screen 40, polarized by crystal 44 and its color again affected by interference medium 51. Hence we have a beam of concentrated, colored, interrupted and polarized light in glass rod 61.

The permanent magnets 56 are producing a field of flux 121 approximately contained in the rod 61. In addition winding 62 is producing flux 122 and winding 63 flux 123 also contained in the said rod.

Therefore the polarized beam 56 will be rotated by the combined field produced by flux 121, 122 and 123.

There are of course, many ways of producing and combining the lines of flux in the said glass rod or its equivalent. For the purpose of this description we will assume that both current windings are actuated from the same source and are acting together to force similar variations of flux in the said rod.

Hence the said variations will occur similarly to variations of flux in the ordinary telephone receiver except for the action of the diaphragm.

Therefore, the beam of light 72 will be rotated in approximate synchronism with these said variations.

Now the analyzer may be positioned so that the said rotation may cause more light to pass through the said analyzer, or the same rotation may cause less light to pass. Or any combination of retarding and passing the said light may be effected by the degree of rotation of the said analyzer and the said plane of light. In the case of alternating current producing the said varying flux the polarization of light passing the analyzer may be a maximum when the current is a minimum or vice versa. It may increase for one direction of current and decrease for current in the opposite direction or the said light may increase or decrease twice during any one alternation all depending on the relative angular position of the said analyzer with respect to the said plane.

This analyzed light may be further varied by the magnetically controlled aperture device 77. This aperture device may of course be designed to produce any desired opening such as a narrow slit, but for the purpose of description we may assume that it operates similarly to the ordinary camera shutters.

Hence the ray of said light is directed on the convex lens 85 for the purpose of concentrating the beam on the smallest practical area of a selenium cell (or a similarly acting cell). The cell is held between low resistance contact poles such as copper, and will change its resistance in approximate syncronism with the variations of said light passing the said analyzer. This action of the cell in changing its resistance when affected by light has been employed of course in the well known "photophone" device.

The photophone is dependent on the action of a moving mass which has inertia. The light affected cell as used in my invention is dependent for its status on the action of light varied by the action of a magnetic field.

It is also evident that the action of this light may be affected by a variation of the said field.

It is evident that the said magnetic field may be replaced by static field, and that the selenium cell may be replaced by cells composed of silver, carbon, tellurium, etc.

The magnetic structure shown is of course only one of many possible efficient forms. For example, it is known that the said light could be reflected by a magnetic surface and its plane of polarization rotated by the variations of flux in the path containing the said surface.

While I have shown and described and have pointed out in the annexed claims, certain novel features of my invention, it will be understood that various omissions, substitutions and changes in the form and detail of the devices illustrated or in its operation may be made by those skilled in the art without departing from the spirit of the invention.

In Fig. 2, there is shown a section of means forming a portion of the flux path, including permanent magnets 56, windings 62, pole pieces 60, glass rod 61, leads 105, and a suitable support means 57.

In Fig. 3, there is shown a plurality of light sources 7 suitably positioned relative to a reflector 8, current leads include a variable rheostat 9 whereby the intensity of light emitted by 7 may be varied.

In Fig. 4, there is shown current leads 95 and 96 supplying a variable speed electric motor 124, having a pulley 129, driving a belt 128, which in turn drives a pulley 127, mounted on support 126. Pulley 127 is designed to support a film or a light sensitive means as 125 which may be moved as pulley 127 is caused to revolve.

Having thus described my invention I claim:—

1. The combination of a light susceptible circuit element arranged to intercept a ray of radiant energy, means for creating a high frequency oscillating flux and positioned to intercept said energy, means including a second source of magnetic flux designed to vary the said radiant energy when operatively associated with the said flux thereby to affect the said light susceptible element to vary its electrical status, and means providing the said ray.

2. In a device of the class described, the combination of means for producing a high frequency magnetic flux, means providing polarized light and means for analyzing same, means providing a light sensitive element forming a portion of a closed electric circuit containing a source of power and an inductive winding, means including a second source of magnetic flux designed to vary the said light when positioned to intercept same, and means for co-operatively associating the above named means whereby both of the said flux means affect the said light and thereby the said circuit.

3. In a device of the class described, the combination with a plurality of means for producing a high frequency magnetic field of force, means providing a source of variable light, means for polarizing and analyzing the said light, means comprising a closed electric circuit including an element to vary the resistance thereof due to the action of the said analyzed light thereby, and means for interrupting the said light consisting of a motor driven revolvable light varying means.

4. In a device of the class described, the combination with a high frequency magnetic structure providing a partially closed flux path containing a transparent medium and means for producing a high frequency magnetic flux in said path, means providing a light beam of variable color and intensity consisting of an electric lamp in circuit with a variable resistance and a suitable light interference medium, means for analyzing said beam including a polariscope, means including a light affected element forming part of a closed electric circuit arranged to affect an external receiver, and means for positioning the above noted means so as to pass the said beam of light along the said lines of force in said transparent medium to rotate and be rotated by the plane of polarization of the said beam thereby.

5. In a device of the class described, the combination of a high frequency magnetic structure providing a closed flux path containing a light reflecting surface for a portion of its length and means for producing a high frequency magnetic flux in said path, means providing a polarized and analyzed light beam of variable intensity and color, means providing a light affected element arranged to affect an electric circuit by a change in its resistance thereby, means for positioning the above said means so as to affect the said light by the said flux, and thus vary the amount of light intercepted by the said cell to vary the current in the said closed circuit thereof.

6. In a device of the class described, the combination with a magnetic structure providing a partial flux path and means for producing carrier current magnetic flux in said entire path means comprising a polariscope and a suitable beam of light, means forming a light affected element constituting a portion of an electric circuit, means for positioning the above noted means so as to pass the said light along the said flux in a transparent medium to rotate and be rotated by the plane of polarization of the said light thereby to vary the amount intercepted by the said light affected element, and suitable enclosing means designed to exclude all other light than the said light from affecting the said element and to permit the necessary external connections.

7. In an electric current amplifier, the combination with a magnetic structure providing a partially closed flux path and means for producing a magnetic flux in said path, means providing a suitable light beam, a polarizer, and an analyzer, means constituting a selenium cell forming part of a closed electric circuit having an alternating source of power, and means for varying the current in the said closed circuit.

8. In an electric current amplifier, the combination with a magnetic structure providing a partially open flux path and a plurality of means for producing variable magnetic flux in said path, means providing a variable colored light beam of variable intensity and size, means providing a rotatable polarizer, a rotatable analyzer and a lens, means providing a light affected resistance changing selenium cell forming a conducting portion of an electric circuit including a source of power, an inductive winding, and a variable resistance, and means for co-operatively associating the above means thereby to affect the said cell due to variations in the said flux producing means.

9. In a device of the class described, the combination of means for producing, varying, coloring, polarizing and analyzing light, a plurality of inductive means to produce a combined magnetic flux to affect said light thereby to affect a light affected resistance changing element in circuit with the said inductive means and thereby amplify combined variations in the said circuit.

10. In a device of the class described, the combination of a flux path containing a transparent medium and a beam of polarized light and means for producing flux in said path, means for analyzing said light and concentrating same on a light affected cell under pressure thereby to vary its resistance and hence affect the circuit of which the said cell is a part, means for permitting said pressure and means constituting a suitable container designed to exclude light and enclose the above named means and to allow necessary external connections.

11. In a current amplifier, the combination of a light sensitive cell providing a laminated structure consisting of alternate layers of selenium and copper and means for suitably introducing same in an electric circuit organization designed to be affected by a change in resistance of the said cell, means providing a magnetically rotated plane of light suitably analyzed thereby to vary the amount of light passed by said analyzer, means permitting said cell to intercept said varying analyzed light to vary the resistance of the said cell thereby, and magnetically controlled means for varying the area of the said cell exposed to the said light, and means designed to place the said means in darkness.

12. In an electric wave oscillator, the combination with a means for producing a carrier current oscillating magnetic flux in a transparent medium, means for producing and varying a beam of light, means for polarizing and analyzing said light consisting of suitably arranged tourmaline crystals, means for interrupting said beam, and means constituting a light affected flux element to intercept said light during its non-interrupted periods.

13. In a current rectifier, the combination with means for producing a magnetic field consisting of permanent and transient magnets, means providing a polariscope and a source of light, means providing an element sensitive to light, means for inserting the said element into an organization comprising a closed electric circuit, means for adjusting the said field and the said polariscope relative to each other so that the said field will rotate the said polarized light, means for allowing the said element to intercept the said rotated light, and means for cooling the said rotated light, and means for cooling the said element and excluding undesired light and its effect therefrom.

14. In a device of the class described, the combination of a magnetic structure containing a flux path and alternating current means for producing a flux in said path to vary a resistance changing circuit element by means of an associated ray of light, means for producing said ray, means for polarizing said ray, means for coloring said ray, and means for positioning said ray in said flux thereby to be rotated by the same.

15. In a device of the class described, the combination with means providing a plurality of light sources each having a separate means of control and means for concentrating same on a focusing lens thereby to obtain and maintain an intense ray of light, means for polarizing, magnetically rotating, coloring, and analyzing said ray thereby to vary when intercepted the resistance of a resistance changing light controlled element forming a conducting portion of a circuit organization, means for interrupting said ray, means for focusing said ray after analyzation, and means comprising sources of power for the said light sources.

16. In a device of the class described, the combination of means providing a polarized ray of light, means providing a field of magnetic flux, means for superimposing said light on said flux to be rotated thereby, means for analyzing said light, means for obstructing a portion of the said analyzed ray, means for focusing said obstructed ray in an inclosed space containing air under pressure, means positioned in said space for intercepting said focused light to have its electrical resistance changed thereby, means comprising a suitable container designed to provide for suitably heating, cooling, ventilating, adjusting and supporting the above named means, and means providing passage through the said container of the necessary electrical connections.

Signed at New York, in the county of New York and State of New York, this 31st day of March, A. D. 1921.

HOWARD J. MURRAY.